United States Patent
Kawamura et al.

(10) Patent No.: US 7,830,924 B2
(45) Date of Patent: Nov. 9, 2010

(54) STUFFING AND DESTUFFING OPERATIONS WHEN MAPPING LOW-ORDER CLIENT SIGNALS INTO HIGH-ORDER TRANSMISSION FRAMES

(75) Inventors: Kenji Kawamura, Yokohama (JP); Takashi Funada, Yokosuka (JP); Masatoshi Shibasaki, Yokohama (JP); Yoshimasa Kusano, Kawasaki (JP); Yusuke Honda, Kawasaki (JP); Hiromi Murakami, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 535 days.

(21) Appl. No.: 11/754,425

(22) Filed: May 29, 2007

(65) Prior Publication Data

US 2008/0145065 A1    Jun. 19, 2008

(30) Foreign Application Priority Data

Dec. 13, 2006    (JP)    .............. 2006-336198

(51) Int. Cl.
*H04J 3/07*    (2006.01)
*H04J 3/18*    (2006.01)

(52) U.S. Cl. .................. 370/505; 370/518; 375/375; 398/156; 341/100; 341/101

(58) Field of Classification Search ............. 370/395.7, 370/395.71, 395.72, 369, 375, 474, 476, 370/477, 503–510, 516–519, 535–546; 398/52–54, 398/154–156, 182, 202; 375/371–376; 341/56, 341/68, 69, 100, 101

See application file for complete search history.

(56) References Cited

U.S. PATENT DOCUMENTS

| 6,111,926 | A * | 8/2000 | Imamura et al. | ............ 375/360 |
| 6,624,766 | B1 * | 9/2003 | Possley et al. | ................ 341/69 |
| 7,443,888 | B2 * | 10/2008 | Surek | ........................ 370/503 |
| 2002/0114357 | A1 * | 8/2002 | Samrao et al. | .............. 370/516 |
| 2003/0076911 | A1 * | 4/2003 | Kobayashi et al. | .......... 375/372 |
| 2007/0025397 | A1 * | 2/2007 | Sticht et al. | ................. 370/503 |

FOREIGN PATENT DOCUMENTS

JP    2004-282632    10/2004
JP    2004-289326    10/2004

* cited by examiner

*Primary Examiner*—Aung S Moe
*Assistant Examiner*—Habte Mered
(74) *Attorney, Agent, or Firm*—Antonelli, Terry, Stout & Kraus, LLP.

(57) ABSTRACT

A unit timing signal synchronized with a high-order transmission frame is used for measuring a difference between the number of data pieces of a client signal mapped to the high-frequency frame and the number of data pieces of the output client signal by integrating the difference therebetween for each unit timing signal. Then stuffing and de-stuffing operations are performed so that a integration result is zero.

3 Claims, 14 Drawing Sheets

STUFFING AND DESTUFFING OPERATIONS WHEN MAPPING LOW-ORDER CLIENT SIGNALS INTO HIGH-ORDER TRANSMISSION FRAMES

CLAIM OF PRIORITY

The present application claims priority from Japanese patent application serial no. 2006-336198, filed on Dec. 13, 2006, the content of which is hereby incorporated by reference into this application.

BACKGROUND OF THE INVENTION

The present invention relates to transmitting equipment and receiving equipment, and particularly to transmitting and receiving equipment with multiple-speed conversion process by means of asynchronous mapping to a high-order transmission frame in an optical signal transmission system.

In the long-distance optical signal transmission system using optical fibers, a reduction in network cost is achieved by extending the transmission distance while ensuring the transmission quality through mapping to a high-order transmission frame added with an FEC (Forward Error Correction) code defined in ITU-T G. 709. Further the usability of the line is improved by increasing the transmission capacity per line, and now a transmission speed of 10 Gbits/s per line is generally used. For example, low order group signals represented by those of 2.4 Gbits/s, which are used in existing networks, are transmitted in such a way that a plurality of lines are multiplexed and accommodated in a signal of 10 Gbits/s, and then mapped to the high-order transmission frame.

Meanwhile in the long-distance optical signal transmission system that accommodates existing network lines, there is a demand for ensuring the so called transparency in order to make it possible to accommodate various types of lines without any influence on the network management and clock network synchronization system of the existing network. More specifically, the transmitting equipment multiplexes transmission signals of the existing network (hereinafter referred to as client signals) without rewriting the terminals and OHs (Over Heads) and maps to the high-order transmission frame, and the receiving equipment reproduces the client signals from the high-order transmission frame without rewriting the terminals and OHs, respectively. Particularly when different existing networks supply client signals whose clocks are not synchronized with each other, it is necessary to multiplex a plurality of client signals having frequency deviation in their clock frequencies, before mapping the client signals to the high-order transmission frame. Thus asynchronous mapping by stuffing multiplexing is generally needed. In ITU-T G.709, there are defined various asynchronous mapping methods of client signals, clock frequency deviations of client signals that can be accommodated, and ranges of stuffing rate.

The long-distance optical transmission system will be described with reference to FIGS. 1 and 2. Here FIGS. 1 and 2 are block diagrams of different long-distance optical transmission systems.

In FIG. 1, a long-distance optical transmission system 1000A includes an optical multiplex transmitting equipment 10-1, transponders 20, and an optical multiplex transmitting equipment 10-2. The optical multiplex transmitting equipment 10 includes: multiplexing equipment 40 for multiplexing four client signals of 2.5 Gbits/s to a high-order signal of 10 Gbits/s; and demultiplexing equipment 50 for converting the high-order signal of 10 Gbits/s to four client signals of 2.4 Gbits/s. Further the transponder 20 includes optical amplifiers 30-1, 30-2, or optical amplifiers 30-3, 30-4. The optical amplifier 30 amplifies the optical signal as it is. Here, the distance between the optical multiplex transmitting equipment 10-1 and the optical multiplex transmitting equipment 10-2 is a high-order transmission frame section. The maximum distance between the optical multiplex transmitting equipment 10 and the transponder 20 is 80 km. The maximum distance between the optical multiplex transmitters 10 is 240 km. It is possible to add an FEC code to the high-order signal of 10 Gbits/s.

In FIG. 2, an optical transmission system 1000B includes an optical transmitting equipment 60-1, transponders 20, and an optical transmitting equipment 60-2. The configuration of the transponders 20 between the optical transmitters 60 is the same as in FIG. 1. However, transmitting equipment 70 of the optical transmitting equipment 60 adds the FEC code to an optical signal of 10 Gbits/s which is a client signal, and then receiving equipment 80 of the optical transmitting equipment 60 receives the optical signal through the high-order transmission frame section which is a long distance section. The client signal shown in FIG. 2, which is the optical signal of 10 Gbits/s, is added with an FEC signal of about 7% and is transmitted over the high-order transmission frame section.

With respect to the configuration of the related art that performs the multiple-speed conversion process by means of asynchronous mapping to the high-order transmission frame in the optical signal transmission system, there is known a method, for example, described in JP-A No. 289326/2004. The configuration of equipment on the transmitting side according to JP-A 289326/2004 will be described with reference to FIG. 3. Here FIG. 3 is a block diagram of transmitting equipment in the related art.

In FIG. 3, a client signal input as an optical signal of 2.5 Gbits/s is subjected to clock extraction and data reproduction by a CDR (Clock Data Recovery) 101. The extracted clock is frequency divided by a frequency divider 104 to a slower speed that can be processed in the transmitting equipment. The reproduced data is serial to parallel converted by an S/P (Serial/Parallel) 102. The serial-parallel converted data is written to a FIFO memory 106 according to an address value that is instructed by a write address counter 105 and generated by the slow clock from the frequency divider 104.

The high-order transmission frame, which is a frame signal added with FEC, is generated in a high-order frame generator 107. The client signal to be stored in the high-order transmission frame is read out to the high-order frame generator 107 from the FIFO memory 106, according to an address value instructed by a read address counter 108 operated by a reference clock that is supplied from an oscillator (hereinafter abbreviated to OSC) 111 into the transmitting equipment.

The reference clock, which is generated by the OSC 111 and supplied into the transmitting equipment, is not synchronous with the extracted clock of the client signal in master-slave configuration. When there is a frequency deviation in the clock frequencies, a difference occurs between the data writing speed of the client signal from the S/P 102 to the FIFO memory 106 and the data reading speed of the client signal from the FIFO memory 106 to the high-order frame generator 107. Thus stuffing is necessary as a method of asynchronous mapping to absorb the speed difference. The stuffing method includes: positive stuffing (PJ: Positive Justification) for equally delaying the data transfer speed of the client signal by temporarily stopping reading of the client signal from the FIFO memory 106 to the high-order frame generator 107 and by inserting dummy data instead; and negative stuffing (NJ: Negative Justification) for equally accelerating the data transfer speed of the client signal by adding reading of the client signal from the FIFO memory 106 to the high-order frame generator 107 and by inserting a client signal into the OH of the high-order frame. In the present specification, the positive stuffing insertion and the negative stuffing insertion are collectively referred to as stuffing insertion.

An address monitor 109 calculates the remaining amount of data of the client signal in the FIFO memory 106 by comparing the address values of the write address counter 105 and the read address counter 108. Then a stuff determination circuit 110 determines the necessity of the stuffing insertion to the high-order transmission frame. For example, when the data reading speed of the client signal from the FIFO memory 106 to the high-order frame generator 107 is faster than the data writing speed of the client signal from the S/P 102 to the FIFO memory 106 with reduced amount of unread data of the client signal in the FIFO memory 106, the stuff determination circuit 110 notifies the read address counter 108 and the high-order frame generator 107 to perform the positive stuffing. On the other hand, when the data reading speed of the client signal from the FIFO memory 106 to the high-order frame generator 107 is slower than the data writing speed of the client signal from the S/P 102 to the FIFO memory 106 with increased amount of unread data of the client signal in the FIFO memory 106, the stuff determination circuit 110 notifies the read address counter 108 and the high-order frame generator 107 to perform the negative stuffing. The high-order frame generator 107 performs a stuffing operation in response to a stuffing operation request from the stuff determination circuit 110, generating a high-order frame together with stuffing information, OH of the high-order transmission frame, and an error correction check bit. The high-order transmission frame is serial to parallel converted by the P/S (Parallel/Serial) 113 and is transmitted as an optical signal to the next stage receiving equipment.

The above described stuffing operation is repeated to control that the data writing speed of the client signal from the S/P 102 to the FIFO memory 106 is identical to the data reading speed of the client signal from the FIFO memory 106 to the high-order frame generator 107 on a time average basis. Thus it is possible to perform the speed conversion process in the transmitting equipment, even if the reference clock in the transmitting equipment and the extracted clock of the client signal are not synchronous in master-slave configuration.

Next, FIG. 4 shows an example of the configuration of equipment on the receiving side according to the related art. Here FIG. 4 is a block diagram of receiving equipment in the related art.

The high-order transmission frame input as an optical signal from a transmission line is subjected to clock extraction and data reproduction by a CDR 201. The extracted clock is frequency divided by a frequency divider 204 to a slower speed that can to be processed in the receiving equipment. The reproduced data is serial to parallel converted by an S/P 202. The serial-parallel converted data is terminated by a high-order frame terminator 203. Then stuffing information notified from the other equipment is output to a stuff detector 205. Based on the received stuffing information, when receiving positive stuffing, the stuff detector 205 performs a de-stuffing operation to temporarily stop a write address counter 206 so that the dummy data inserted by the other equipment is not written to a FIFO memory 207. When receiving negative stuffing, the stuff detector 205 de-stuffs the write address counter 206 so that the client signal additionally inserted to the OH of the high-order transmission frame by the other equipment is written to the FIFO memory 207. The client signal extracted from the high-order frame terminator 203 is written to the FIFO memory 207 according to an address value instructed by the write address counter 206, based on a slow clock from the frequency divider 204 and on the information from the stuff detector 205.

With the operation described above, the client signal mapped to the received high-order transmission frame is de-stuffed without missing data and entirely stored in the FIFO memory 207.

A clock for operating a read address counter 209 of the FIFO memory 207 is supplied from a voltage controlled crystal oscillator (hereinafter abbreviated to VCXO) 212. The VCXO 212 is configured as a PLL (Phase Locked Loop) controlled by a phase comparison result from a phase comparator (hereinafter abbreviated to PC) 210. The VCXO 212 is controlled so that the phase difference of the PC 210 is zero through a filter part 211 that determines the control characteristics of the PLL. The PC 210 calculates the amount of data remaining in the FIFO memory 207 by comparing the address values of the write address counter 206 and read address counter 207 of the FIFO memory 207. For example, when the data writing speed of the client signal from the high-order frame terminator 203 to the FIFO memory 207 is faster than the data reading speed of the client signal from the FIFO memory 207 to the P/S 214 with increased amount of unread data of the client signal in the FIFO memory 207, the PC 210 increases the clock frequency of the output of the VCXO 212 and thus controls the PLL to increase the data reading speed of the client signal from the FIFO memory 207 to the P/S 214. On the other hand, when the data writing speed of the client signal from the high-order frame terminator 203 to the FIFO memory 207 is slower than the data reading speed of the client signal from the FIFO memory 207 to the P/S 214 with reduced amount of unread data of the client signal in the FIFO memory 207, the PC 210 reduces the clock frequency of the output of the VCXO 212 and thus controls the PLL to reduce the data reading speed of the client signal from the FIFO memory 207 to the P/S 214. The client signal read from the FIFO memory 207 is serial to parallel converted by the P/S 214 and is transmitted as an optical signal to the next stage optical transmission system.

According to the above described related art, the transmitting equipment maps the client signal asynchronously to the high-order transmission frame, by comparing the address values of the write address counter and read address counter of the FIFO memory in which the client signal is stored and by performing the stuffing operation so that the data writing speed and data reading speed of the client signal are identical on a time average basis, without synchronizing with the clock extracted from the client signal in master/slave configuration. The receiving equipment reproduces in the output the same clock frequency as the client signal input to the transmitting equipment, by comparing the address values of the write address counter and read address counter of the FIFO memory in which the client signal is stored and by performing the de-stuffing operation so that the data writing speed and data reading speed of the client signal are identical on a time average basis. Thus the receiving equipment can transmit the client signal mapped to the high-order transmission frame without missing data, to the next stage optical transmission system.

Next, a description will be made with respect to jitter and wonder generated by the stuffing operation with reference to FIGS. 5 to 7. Here FIG. 5 is a view illustrating the variation in phase difference over time. FIG. 6 is a view illustrating the transfer characteristic of PLL in receiving equipment. FIG. 7 is a view illustrating the phase difference correction by reduction of stuff determination threshold.

In the transmitting equipment, as the extracted clock of the client signal and the reference clock supplied from the OSC 111 are asynchronous with each other, the clock phases are gradually displaced when there is a frequency deviation in these clock frequencies. In the above described related art, the phase difference is detected by comparing the address values of the write address counter 105 and read address counter 108 of the FIFO memory 106 and by calculating the amount of unread data of the client signal in the FIFO memory 106. When the phase difference exceeds a certain determination threshold, the phase difference between the clock frequencies is corrected to be constant on a time average basis by performing a stuffing insertion by the positive or negative stuffing.

FIG. 5 shows the manner in which the phase difference is corrected by the positive stuffing. In FIG. 5, there is shown the variation of the phase difference that remains without being completely corrected within a range of the stuff determination threshold. This variation is jitter or wonder generated by the stuffing operation. The peak amount of the jitter or wonder generated by the stuffing operation is substantially the same value as the determination threshold of the stuffing operation. The frequency of the jitter or wonder generated by the stuffing operation is dependent on the frequency deviation between the clock frequencies. The frequency of the jitter or wonder increases when the frequency deviation is large, and the frequency of the jitter or wonder decreases when the frequency deviation is small. Incidentally in ITU-T G.810, the jitter is defined as phase variation at rates greater than 10 Hz while the wonder is defined as phase variation at rates less than 10 Hz.

As described above, the receiving equipment includes the PLL for controlling the clock frequency of the output of the VCXO 212 based on the amount of unread data of the client signal in the FIFO memory 207. The input/output transfer characteristic of the PLL are generally designed to have LPF (Low Pass Filter) characteristics as shown in FIG. 6. With the LPF characteristics, when a frequency fo of the jitter or wonder generated by the stuffing operation in the transmitting equipment is sufficiently higher than a cut-off frequency fc of the PLL in the receiving equipment, the jitter or wonder of the clock of the client signal reproduced in the receiving equipment is suppressed sufficiently to some extent. However, when the frequency fo of the jitter or wonder generated by the stuffing operation in the transmitting equipment decreases, the jitter or wonder is not suppressed even by the LPF characteristics of the PLL of the receiving equipment. As a result, the jitter or wonder is output being superimposed on the reproduced clock of the client signal. Reduction of the cut-off frequency of the PLL is effective to suppress the jitter or wonder generated by the stuffing operation. However, when the cut-off frequency of the PLL is reduced, the following problems generally arise: the response of the PLL is delayed, the pull-in time increases, and the peak is likely occur in the input/output transfer characteristic of the PLL. In fact, sufficient suppress characteristics are not often realized.

In order to suppress the jitter or wonder generated when the client signal is reproduced by the stuffing operation, it is the most important to reduce the insertion amount per stuffing operation by detecting the phase difference between the extracted clock of the client signal and the reference clock with high accuracy, and thereby reducing the stuff determination threshold as small as possible, in other words to reduce the peak amount of the jitter or wonder generated by the stuffing operation. FIG. 7 shows the manner in which the phase difference is corrected by the positive stuffing when the stuff determination threshold is reduced. Comparing with FIG. 5, when the stuff determination threshold is reduced, the peak amount of the jitter or wonder generated by the stuffing operation becomes smaller, while the frequency of the jitter or wonder generated by the stuffing operation becomes relatively high as the number of times of stuffing insertion increases. Thus the jitter or wonder can be more effectively suppressed by the PLL of the receiving equipment.

As a technology focusing on the above described feature to suppress the jitter, there has been proposed a method described in JP-A No. 282632/2004. According to JP-A No. 282632/2004, the stuff determination is made by comparing the address values of the write address counter 105 and read address counter 108 of the FIFO memory 106. Generally the stuff determination threshold is limited by the slow clock frequency which is the data writing clock and data reading clock of the client signal to/from the FIFO memory 106, and the insertion amount per stuffing operation ranges from one byte to several bytes. In order to prevent such a problem, the transmitting equipment performs bit stuffing insertion at a timing separated in an average manner according to the stuff generation interval. Then the receiving equipment reproduces the client signal based on the bit stuffing information inserted in an average manner. As a result, it is possible to suppress the jitter by reducing the insertion amount per stuffing operation.

However, the above described related art has the following problems.

First, the stuff determination threshold is limited by the slow clock frequency of the FIFO memory as the stuff determination is made by comparing the address values of the read address counter and write address counter of the FIFO memory. The slow clock frequency is used in such elements as the client signal and the high-order terminator that have a relatively large scale of logics. Generally in order to satisfy the timing of such logical circuits, the clock frequency is frequency divided to a speed as slow as about 100 MHz. There is no solution presented for the fundamental problem with respect to reducing the stuff determination threshold in JP-A No. 289326/2004.

Second, in JP-A No. 282632/2004, there is proposed the method to solve the first problem in a pseudo manner, in which the stuffing information of several bytes detected at a time is separated on a time average basis to perform as bit stuffing. However, the phase difference between the client signal and the client signal mapped to the high-order transmission frame is not detected with high accuracy. Thus, although the jitter which is the phase variation of a relatively high frequency can be suppressed, there is a problem for the wonder which is the phase variation of a very low frequency in which the stuffing information is rarely detected. That is, it is difficult to perform the bit stuffing correctly separated on a time average basis, as the time interval of when the next stuffing information is generated, or the stuffing interval, may not be expected. Thus there has been a problem that the wonder is not suppressed and remains in the reproduced clock of the client signal in the output of the receiving equipment.

Third, in the above described related art, as the stuff determination is made by comparing the address values of the read address counter and write address counter of the FIFO memory, the stuff determination can be made only between the read address counter and write address counter of the FIFO memory that performs asynchronous mapping. Because of this problem, for example, when the PLL is used for phase adjustment of the internal logic and the like with respect to the clock supplied to the read address counter, or when the PLL is used as means of generating a multiplied clock to form an intermediate transmission frame through which the client signal is multiplexed and mapped to the high-order transmission frame, jitter or wonder generated by the PLL is added to the clock that operates the read address counter. For this reason, an accurate stuff determination may not be made by comparing the read address counter and write address counter of the FIFO memory. Thus there has been a problem that in the other receiving equipment, the jitter or wonder generated by the PLL is not perfectly suppressed and remains in the reproduced clock of the client signal.

SUMMARY OF THE INVENTION

The above described problems can be solved by transmitting equipment including: a data number count part for receiving a first client signal, speed converting the first client signal to generate a second client signal, transmitting a high-order transmission frame including the second client signal, and counting the number of data pieces of the first client signal received within a unit time; a data number selection part for selecting the number of data pieces of the second client transmitted to the high-order transmission frame within the unit time; an integration counter for integrating a difference between outputs of the data number count part and of the data number selection part for each unit time; and a stuff determination part for making stuff determination when the output of the integration counter exceeds a certain threshold, in which the stuff determination part performs stuffing insertion so that the output of the integration counter approaches zero on a time average basis.

Further the above described problems can be solved by receiving equipment including: a data number selection part for receiving a high-order transmission frame, extracting a second client signal from the high-order transmission frame, speed converting the second client signal to generate a first client signal, transmitting the first client signal, and calculating the number of data pieces of the second client signal extracted based on the stuffing information received within a unit time; a data number count part for counting the number of data pieces of the first client signal transmitted within the unit time; an integration counter for integrating output results of the data number selection part and of the data number count part for each unit time; and a filter part for generating a control voltage of a voltage controlled crystal oscillator (VCXO) from the output result of the integration counter, in which the integration counter performs a de-stuffing operation by controlling a clock frequency of an output of the VCXO so that an output of the integration counter approaches zero on a time average basis.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Figure 1:
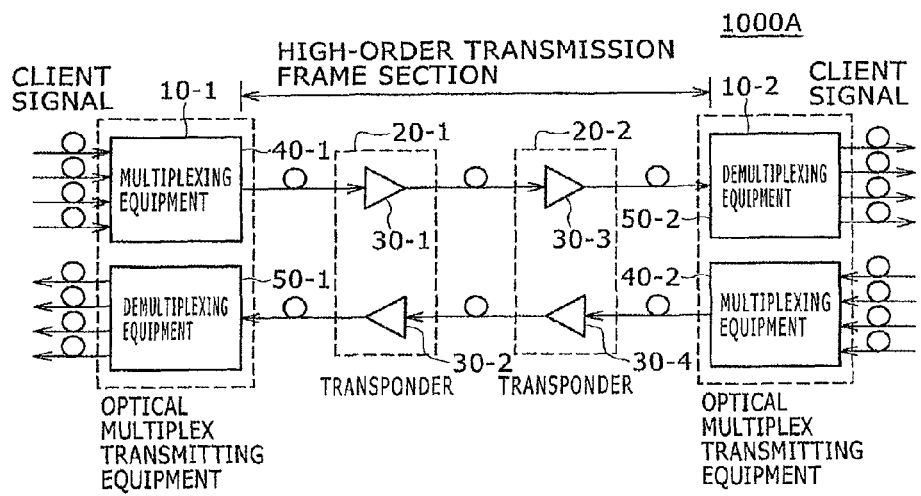
FIG. 1 is a block diagram of a long-distance optical transmission system.

Modes for carrying out the invention will be described below based on preferred embodiments with reference to the accompanying drawings. Incidentally, in the present specification, substantially like parts are denoted by like reference numerals and the description will not be repeated.

Figure 8:
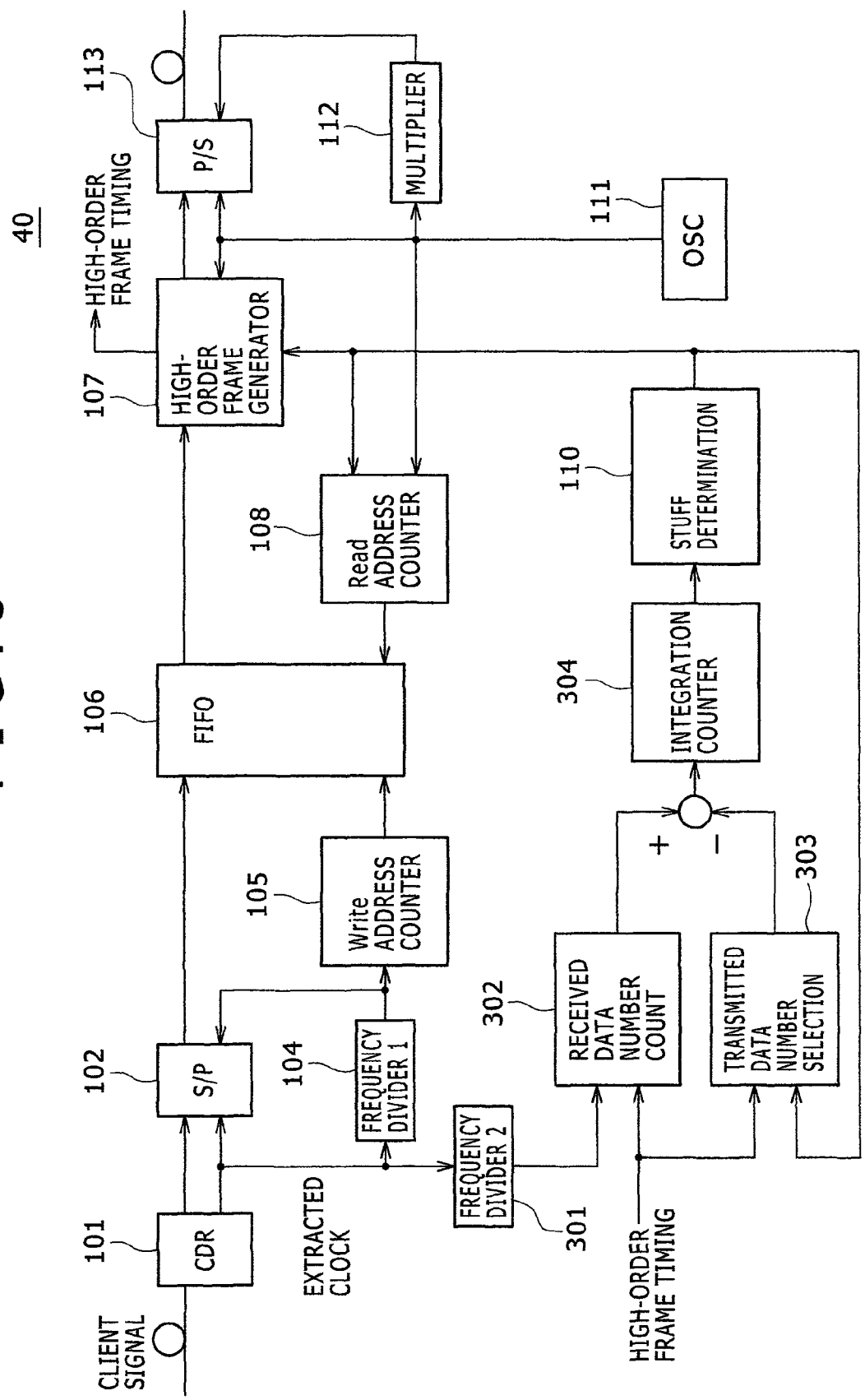
FIG. 8 is a block diagram of multiplexing equipment.

FIG. 8 is a block diagram of multiplexing equipment. In FIG. 8, multiplexing equipment 40 includes: a high-order frame generator 107 provided with a function for generating a high-order frame timing used as a unit frame timing; a frequency divider 301 for frequency dividing an extracted clock of a client signal extracted in a CDR 101 to a range of frequency available for count operation in a received data number count part 302; the received data number count part 302 for counting the number of data pieces of the client signal received in a high-order frame timing by the output clock of the frequency divider 301; a transmitted data number selection part 303 for selecting the number of data pieces of the client signal mapped to the high-order transmission frame in the high-order frame timing; an integration counter 304 for integrating the difference between the outputs of the received data number count part 302 and of the transmitted data number selection part 303 for each high-order frame timing; and a stuff determination circuit 110 for making a stuff determination when the output of the integration counter 304 exceeds a certain threshold.

The multiplexing equipment 40 inputs four optical signals of 2.5 Gbits/s and outputs a multiplexed optical signal of 10 Gbits/s.

Figure 2:
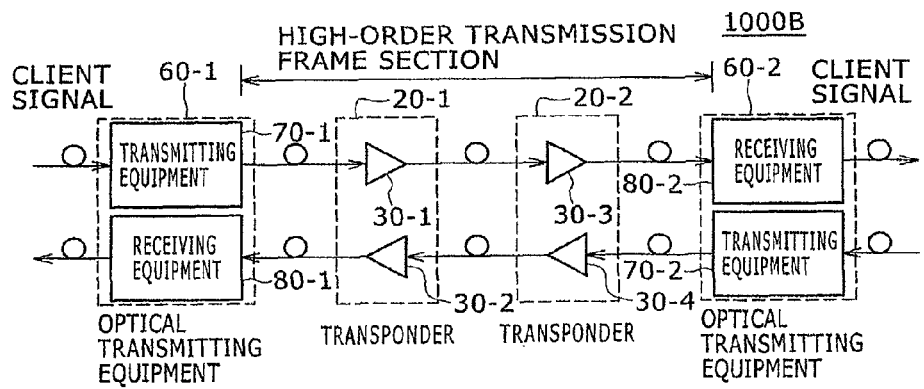
FIG. 2 is a block diagram of another long-distance optical transmission system.
Figure 3:
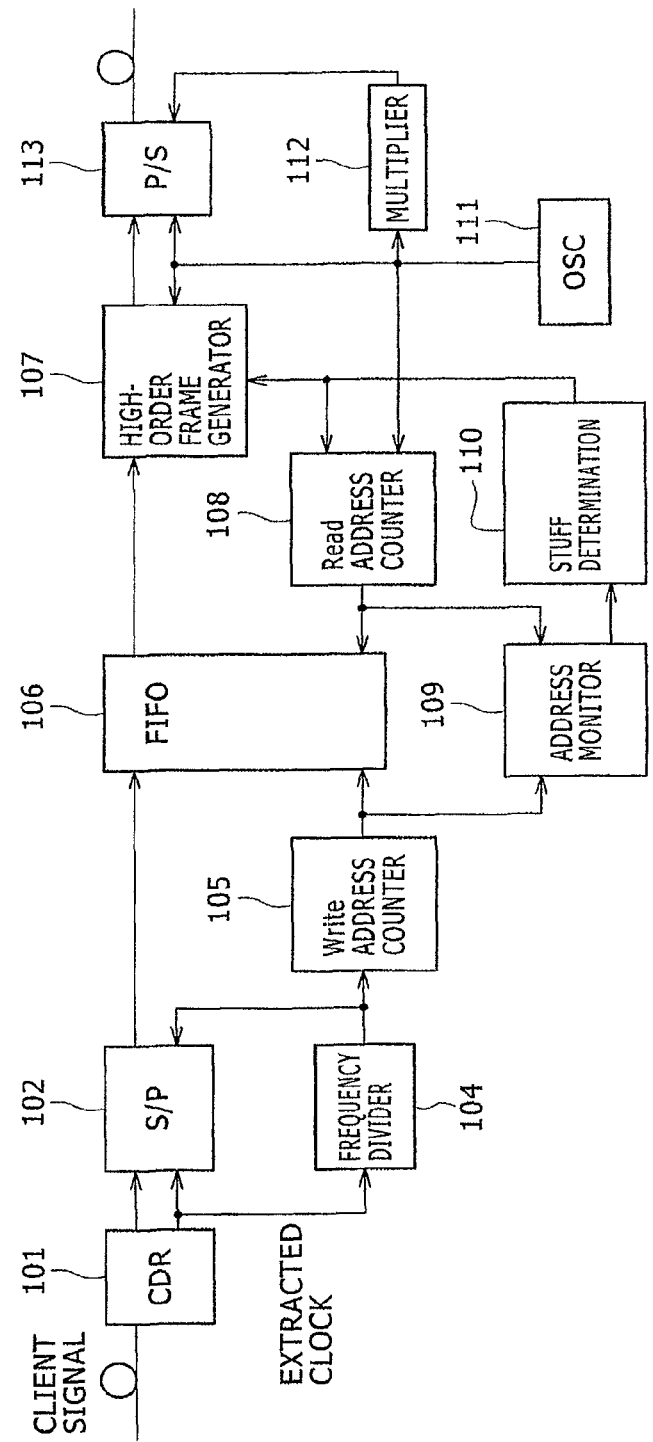
FIG. 3 is a block diagram of transmitting equipment in the related art.
Figure 4:
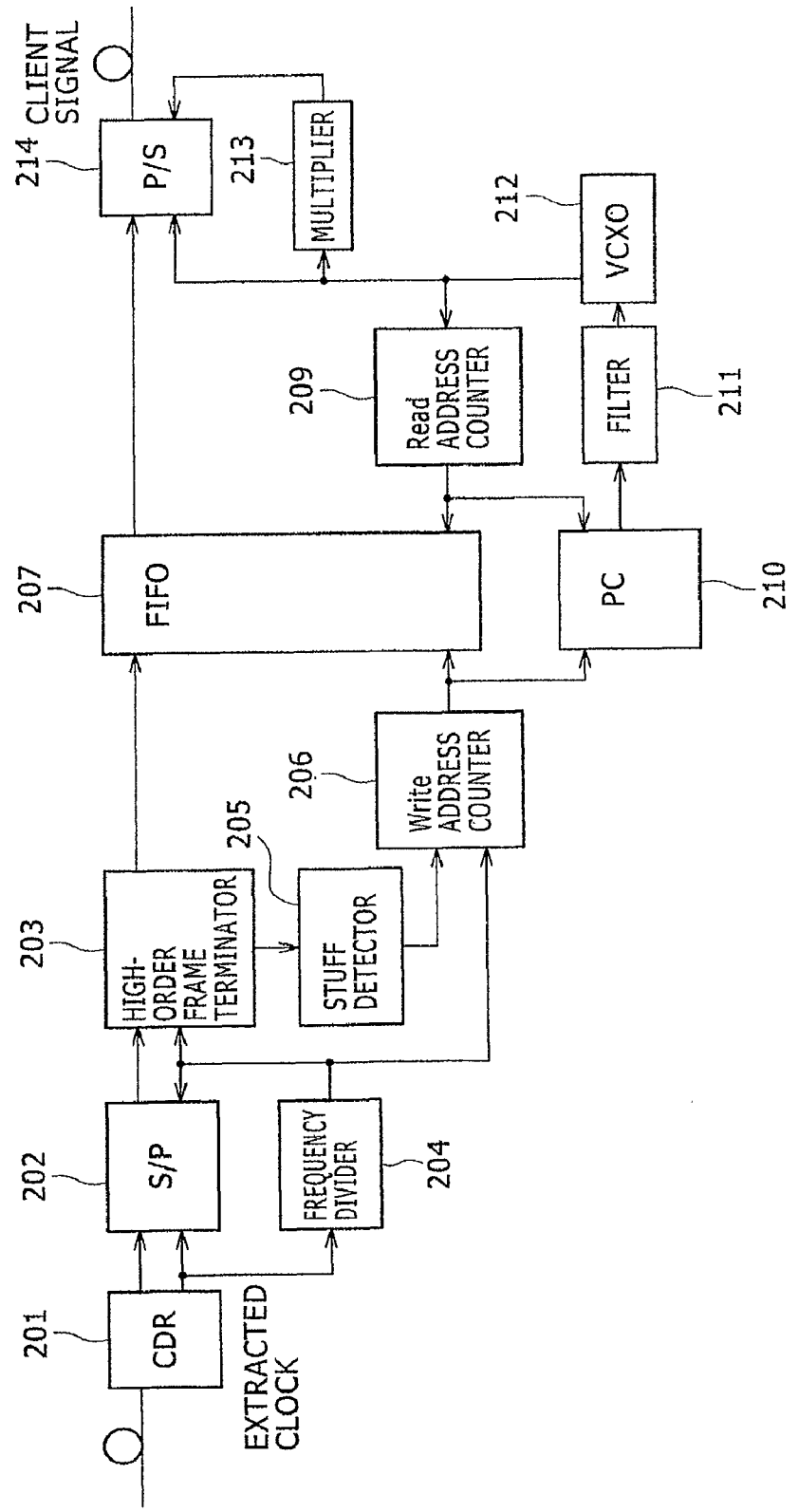
FIG. 4 is receiving equipment in the related art.
Figure 5:
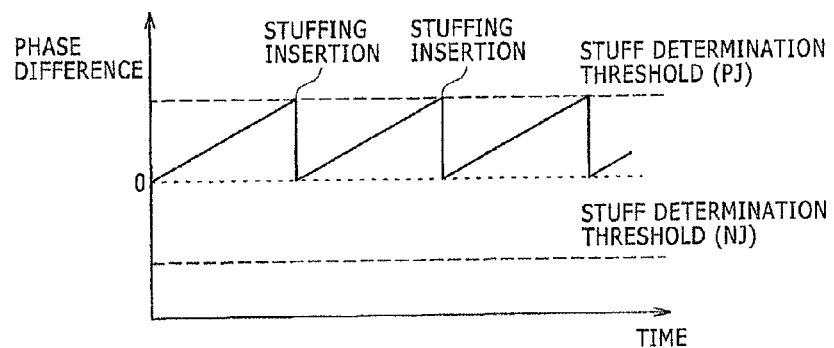
FIG. 5 is a view illustrating the variation of the phase difference over time.
Figure 6:
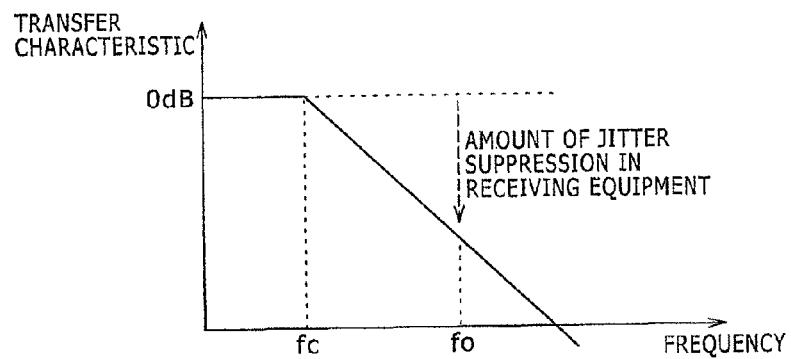
FIG. 6 is a view illustrating the transfer characteristic of PLL in receiving equipment.
Figure 7:
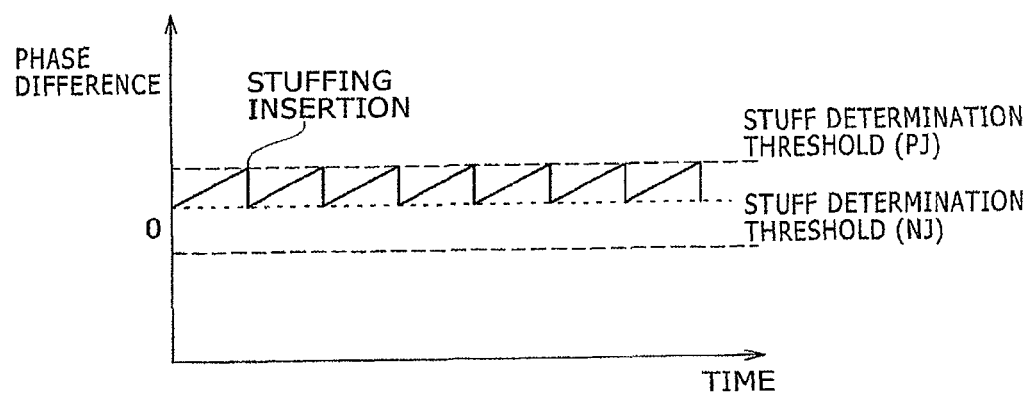
FIG. 7 is a view illustrating the phase correction by reduction of stuff determination threshold.

In FIG. 8, only one input is shown and the optical-electrical conversion part and the electrical-optical conversion part are omitted for illustrative convenience. Further, the multiplexing equipment 40 may be the transmitting equipment 70 described above with reference to FIG. 2. This is the same in the other embodiments in the present specification.

The above description has assumed that the number of times the stuffing can be inserted into the high-order transmission frame is once per frame, and that the unit frame timing generated in the high-order frame generator 107 is the same timing as the high-order transmission frame. However, when the stuffing can be performed P times (P>1) for one frame in the high-order transmission frame, the unit frame timing may be set to a timing of 1/P of the high-order transmission frame. Further when the stuffing can be performed once for Q frames (Q>1) in the high-order transmission frame, the unit frame timing may be set to a timing of Q times the high-order transmission frame.

In the following description, it is assumed that the number of times the stuffing can be performed to the high-order transmission frame is once per frame and that the unit frame timing generated in the high-order frame generator 107 is the same timing as the high-order transmission frame.

The received data number count part 302 includes a counter in which a high-order frame timing output from the high-order frame generator 107 is provided as a load pulse, and counts the number of received data pieces of the client signal received in the high-order frame timing, using the output clock of the frequency divider 301.

Figure 9:
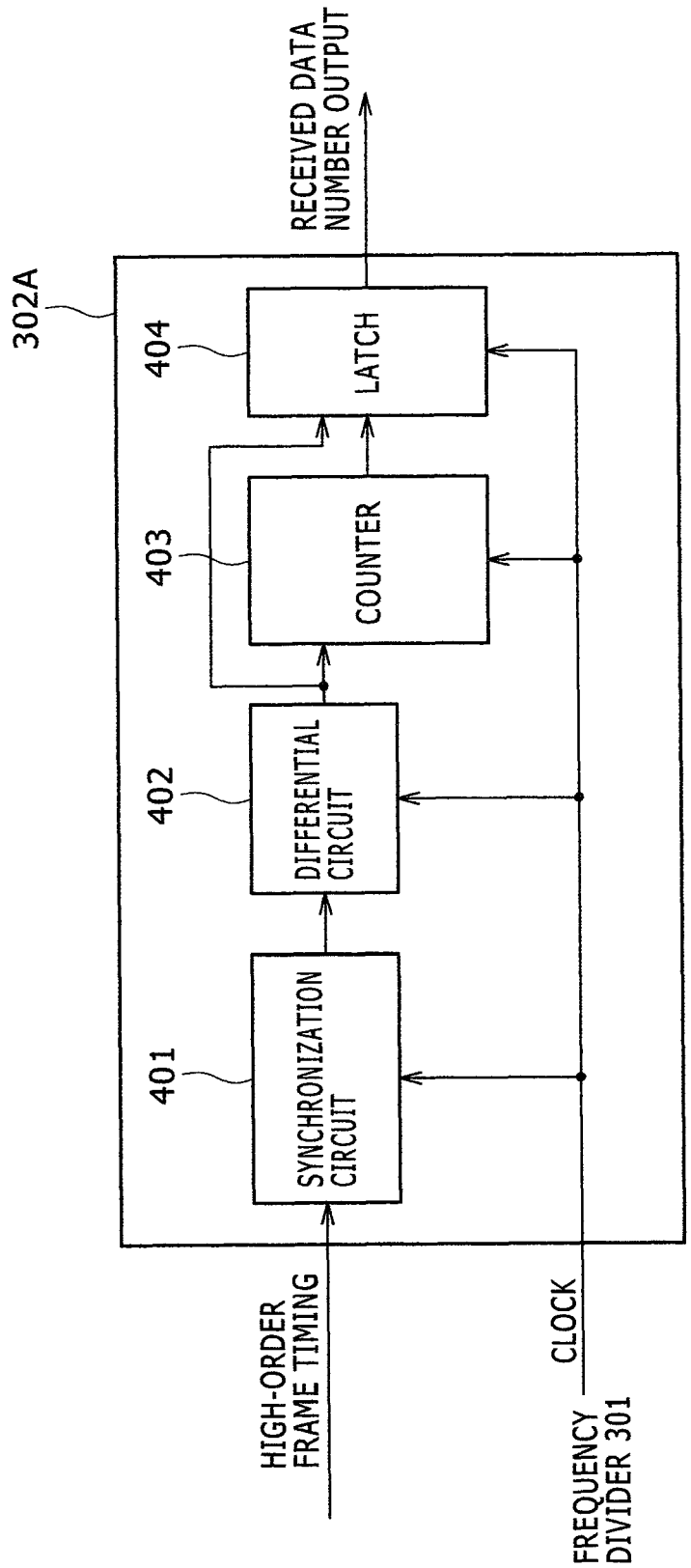
FIG. 9 is a block diagram of a received data number count part.
Figure 10:
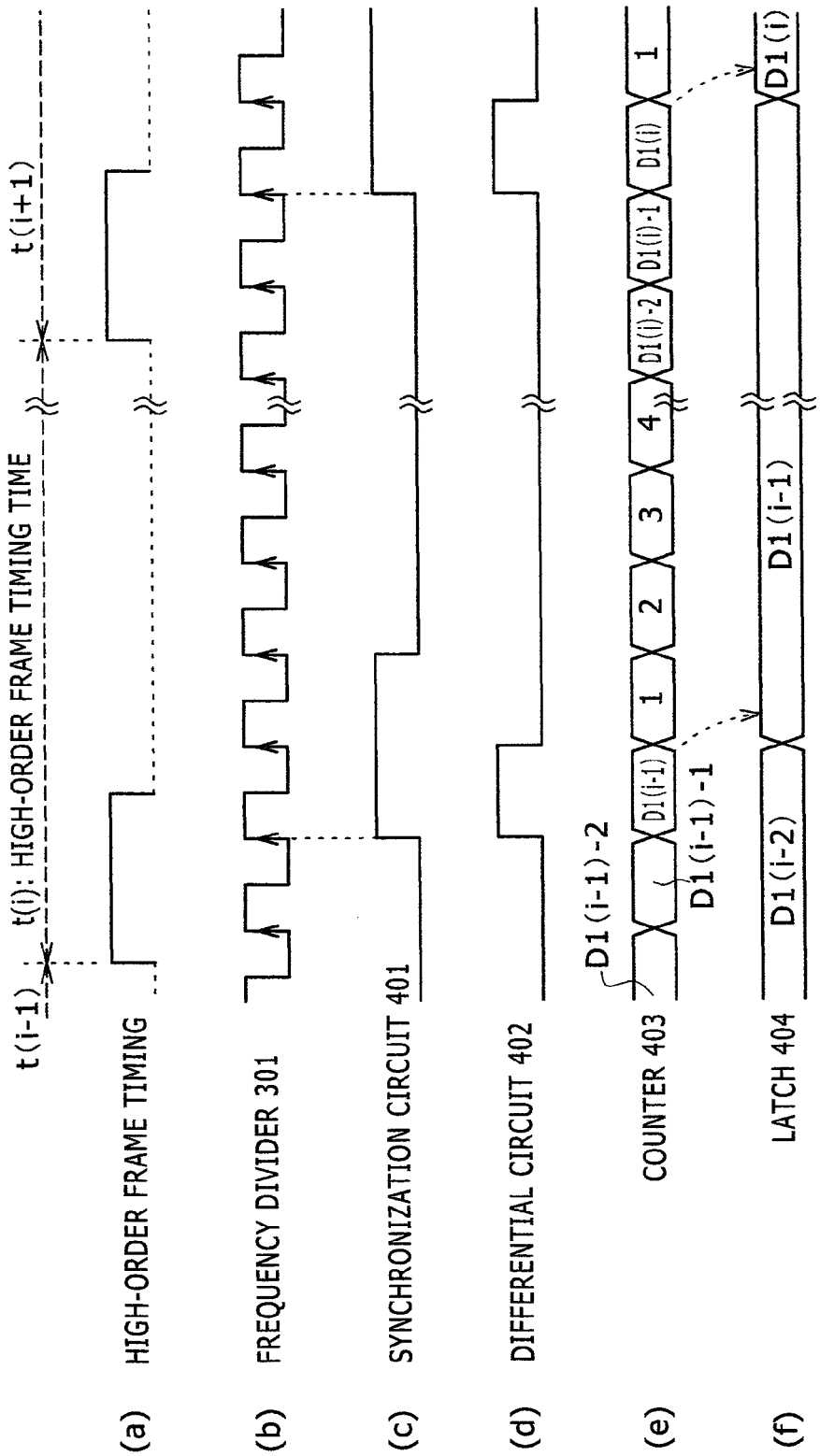
FIG. 10 is a time chart of the received data number count part.

FIG. 9 is a block diagram of a received data number count part. FIG. 10 is a time chart of the received data number count part. In a received number count part 302A in FIG. 9, the high-order frame timing is synchronized by a synchronization circuit 401 using the clock output from the frequency divider 301, and then is differentiated by a differential circuit 402 to use as a clear pulse of a counter 403. An output of the counter 403 is loaded in a latch circuit 404 at the same timing as the clear pulse which is the output of the differential circuit 402. With this configuration, when the frequency divider 301 frequency divides the extracted clock of the client signal to generate ⅛ frequency divided output, the received data number count part 302 can measure the number of data pieces of the client signal received in the high-order frame timing in unit of 8 bits, or with an accuracy of one byte.

In FIG. 10, (a) represents the high-order frame timing, (b) represents the clock from the frequency divider 301, (c) represents the output of the synchronization circuit 401, (d) represents the output of the differential circuit 402, (e) represents the output of the counter 403, and (f) represents the output of the latch 404. As shown in FIG. 10 (c), the synchronization circuit 401 raises the output when the clock hits twice High-Order Frame High on the rising edge. The synchronization circuit 401 brings down the output when the clock hits twice High-Order Frame Low on the rising edge. The differential circuit 402 outputs High for one clock cycle from the output on the rising edge of the synchronization circuit 401. The latch 404 latches the output of the counter 403 on the trailing edge of the differential circuit 402.

Figure 11:
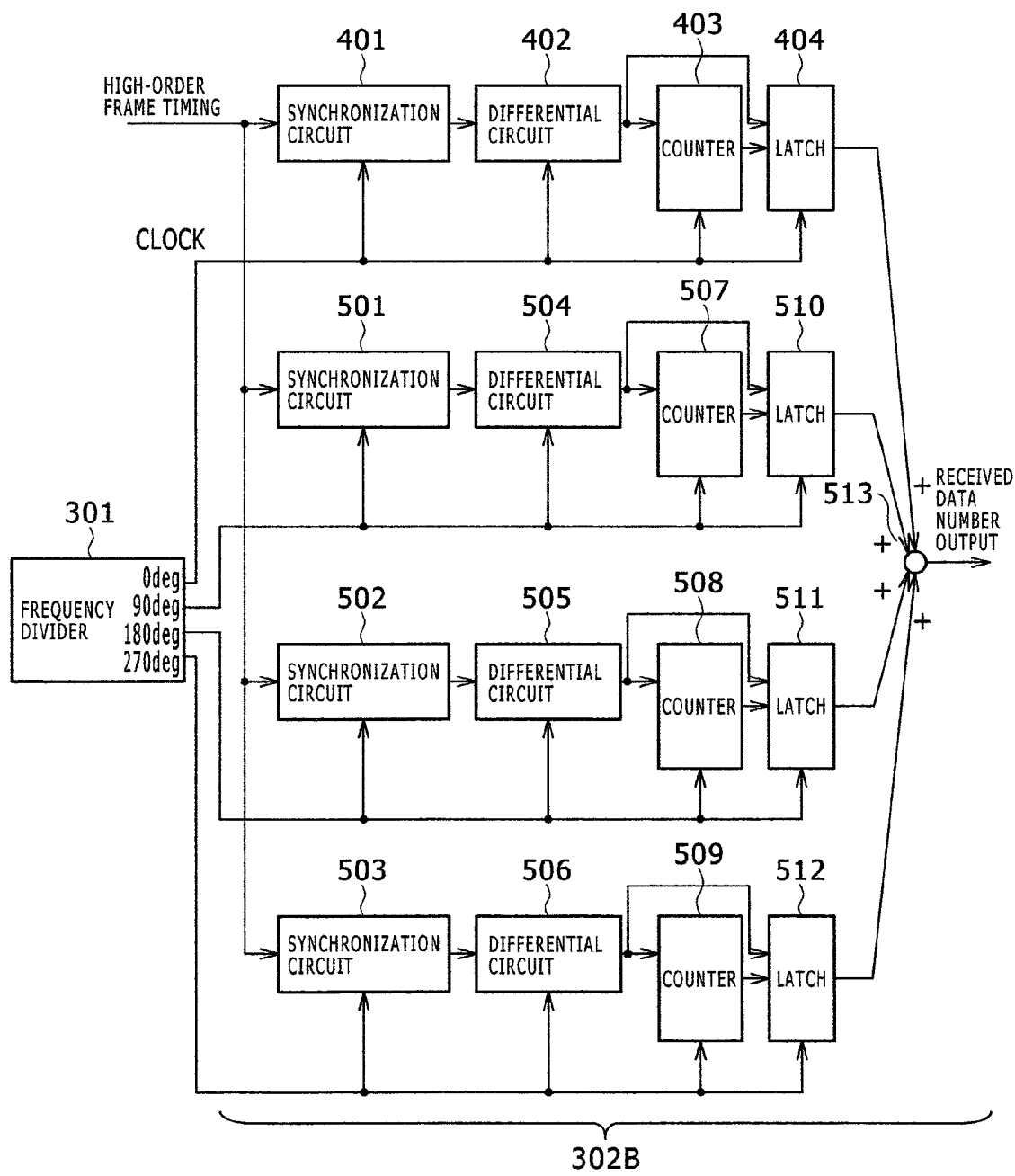
FIG. 11 is a block diagram of another received data number count part.
Figure 12:
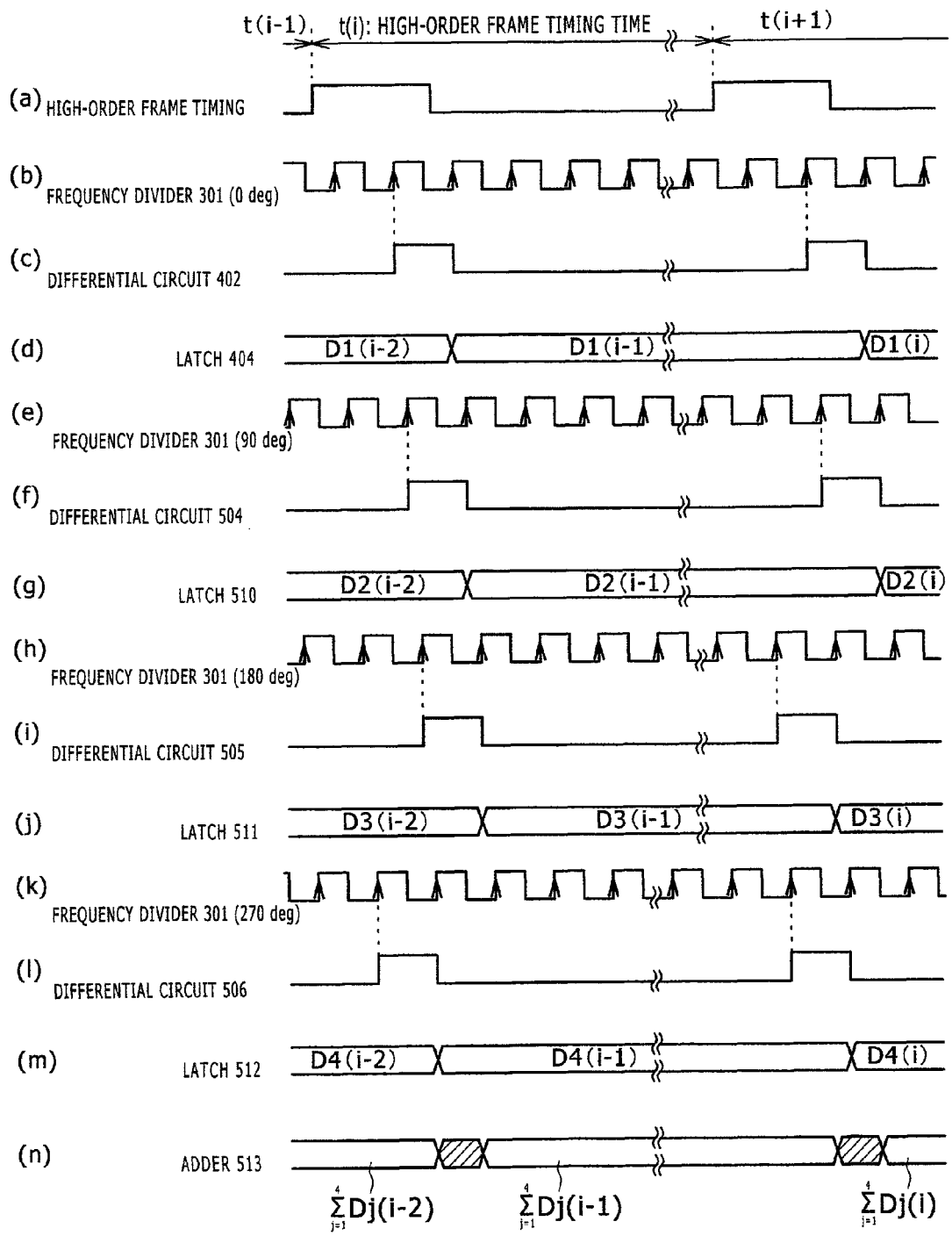
FIG. 12 is a time chart of another received data number count part.

FIG. 11 is a block diagram of another received data number count part. FIG. 12 is a time chart of another received data count part. In FIG. 11, the frequency divider 301 outputs frequency divided clocks having four different phases of 0, 90, 180, and 270 degrees. The numbers of received data are counted using the frequency divided clocks of each of the phases, respectively. Then the measurement results of the received data numbers are added all together. With this configuration, for example, when the frequency divider 301 frequency divides the extracted clock of the client signal to generate ⅛ frequency divided output with four distinct phases, the received data number count part 302B can measure the number of data pieces of the client signal received in the high-order frame timing in unit of 2 bits, or with an accuracy of ¼ bytes.

In FIG. 12, (a) represents the high-order frame timing, (b) represents the 0 degree clock output of the frequency divider 301, (c) represents the output of the differential circuit 402, (d) represents the output of the latch 404, (e) represents the 90 degree clock output of the frequency divider 301, (f) represents the output of a differential circuit 504, (g) represents the output of a latch 510, (h) represents the 180 degree clock output of the frequency divider 301, (i) represents the output of a differential circuit 505, (j) represents the output of a latch 511, (k) represents the 270 degree clock output of the frequency divider 301, (l) represents the output of a differential circuit 506, (m) represents the output of a latch 512, and (n) represents the output of an adder 513. The operations of the components are the same as those in FIG. 10 and the description will be omitted, except for the operation of the adder 513. The adder 513 outputs an addition result that is effective except for the beginning or end of one clock cycle.

As described above, with the configuration of the transmitting equipment according to the embodiment, it is possible to measure the number of data pieces of the client signal in the high-order frame timing with ease and high accuracy by counting and adding the number of data pieces of the client signal received in the high-order frame timing in a parallel manner, by reducing the frequency division ratio of the frequency divider 301 as well as providing multiple phases in the output of the frequency divider 301.

Now returning to FIG. 8, the number of data pieces of client signal that can be stored in the high-order transmission frame is determined by the frame configuration of the high-order transmission frame. For this reason, the transmitted data number selection part 303 selects a fixed value according to the output of the stuff determination circuit 110, and outputs the result. The high-order transmission frame is configured such that the number of data pieces of the client signal to be mapped to the high-order transmission frame is Dn byte when the stuffing operation is not performed, and that the stuffing operation is performed by one byte for both the positive stuffing and the negative stuffing. In this frame configuration, the transmitted data number selection part 303 selects and outputs Dn when the stuffing operation is not performed, Dn−1 when the positive stuffing is performed for one byte, and Dn+1 when the negative stuffing is performed for one byte, according to the output of the stuff determination circuit 110. The integration counter 304 integrates the difference between the outputs of the received data number count part 302 and of the transmitted data number selection part 303 for each high-order frame timing, thereby measuring the difference between the number of data pieces of the client signal received in the transmitting equipment and the number of data pieces of the output client signal mapped to the high-order transmission frame. The stuff determination circuit 110 notifies the read address counter 108 and the high-order frame generator 107 to perform the positive stuffing when the output of the integration counter 304 increases over the stuff determination threshold, and to perform the negative stuffing when the output of the stuff determination circuit 110 decreases below the stuff determination threshold.

As described above, with the configuration of the transmitting equipment according to the embodiment, it is possible to perform the stuffing operation so that the output of the integration counter 304 is zero on a time average basis, allowing to control so that the number of data pieces of the received client signal is identical to the number of data pieces of the output client signal mapped to the high-order transmission frame. Thus the transmitting equipment can map the received client signal asynchronously to the high-order transmission frame without missing data. Further the transmitting equipment detects the number of data pieces of the received client signal as well as the number of data pieces of the client signal mapped to the high-order transmission frame with high accuracy without using the address values of the read address counter and write address counter of the FIFO memory. Thus the transmitting equipment can know the phase difference between the extracted clock of the client signal and the reference clock within the transmitting equipment with high accuracy. This makes it possible to easily reduce the threshold of the stuff determination circuit.

Figure 13:
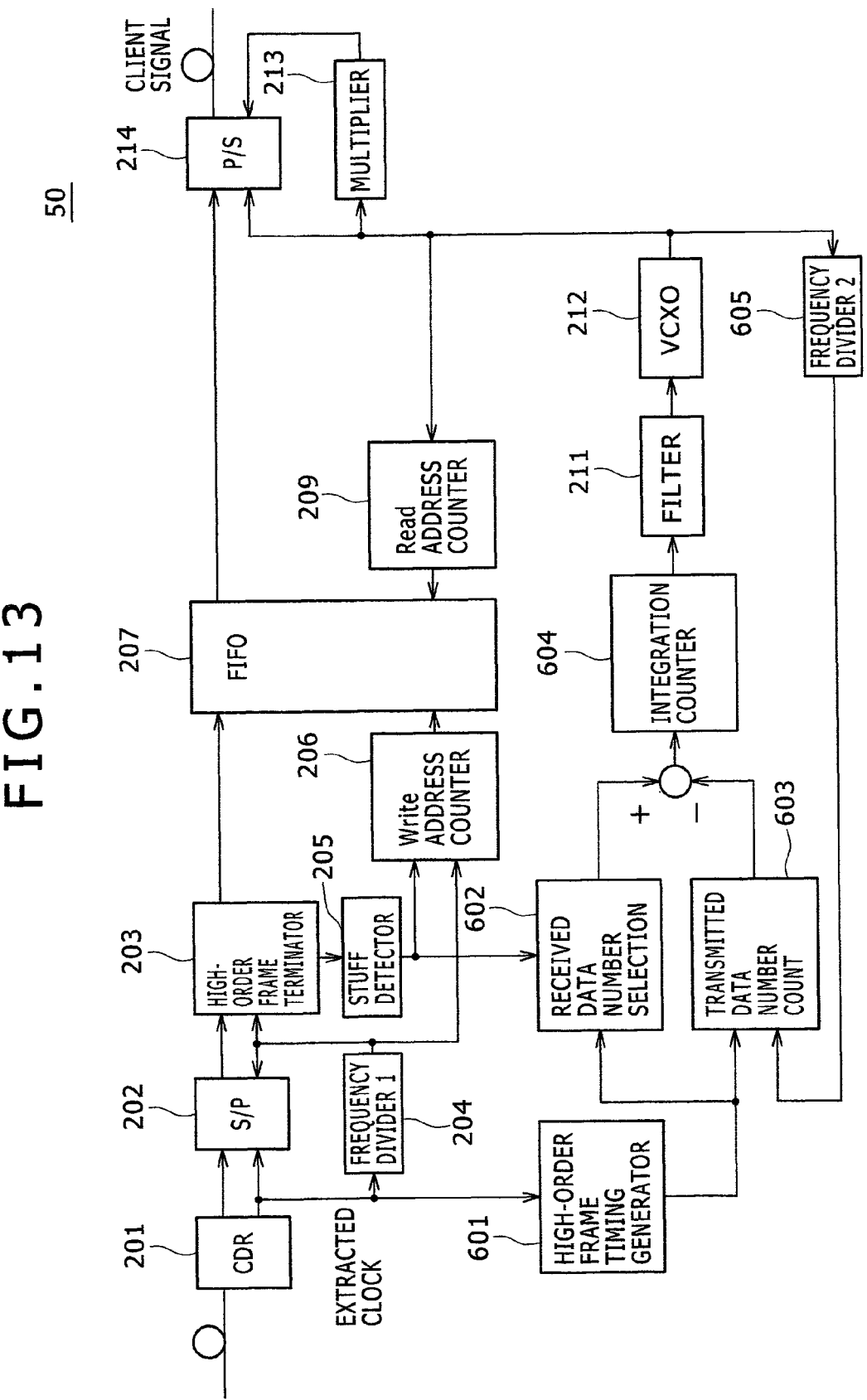
FIG. 13 is a block diagram of receiving equipment.

FIG. 13 is a block diagram of demultiplexing equipment. In FIG. 13, demultiplexing equipment 50 includes: a high-order frame timing generator 601 for generating a high-order frame timing used as a unit frame timing by the extracted clock of the high-order transmission frame received from the CDR 201; a received data number selection part 602 for selecting the number of data pieces of the received client signal mapped to the high-order transmission frame in the high-order frame timing, based on the stuffing information received in the high-order frame timing; a frequency divider 605 for frequency dividing the output clock of the VCXO 212 to a range of frequency available for count operation in the transmitted data number count part 603; the transmitted data number count part 603 for counting the number of data pieces of the client signal transmitted as an optical signal in the high-order frame timing, using the output clock of the frequency divider 605; an integration counter 604 for integrating the difference between the outputs of the received data number selection part 602 and of the transmitted data number count part 603 for each high-order frame timing; and a filter part 211 for generating a control voltage of the VCXO 212 by calculating a filter according to the control characteristics from the output result of the integration counter 604.

The demultiplexing equipment 50 inputs a multiplexed optical signal of 10 Gbits/s and outputs four demultiplexed optical signals of 2.5 Gbits/s. In FIG. 13, only one output is shown and the optical-electrical conversion part and the electrical-optical conversion part are omitted for illustrative convenience. Further the demultiplexing equipment 50 may be the receiving equipment 80 described above with reference to FIG. 2. This is the same in the other embodiments in the present specification.

In FIG. 13, the description has assumed that the number of times the stuffing can be inserted into the high-order transmission frame is once per frame, and that the unit frame timing generated in the high-order frame timing generator 601 is the same timing as the received high-order transmission frame. However, when the stuffing can be performed P times (P>1) for one frame in the high-order transmission frame, the unit frame timing may be set to a timing of 1/P of the high-order transmission frame. When the stuffing can be performed once for Q frames (Q>1) in the high-order transmission frame, the unit frame timing may be set to a timing of Q times the high-order transmission frame. In the following description, it is assumed that the number of times the stuffing can be performed to the high-order transmission frame is once per frame and that the unit frame timing generated in the high-order frame generator 601 is the same timing as the high-order transmission frame.

The number of data pieces of client signal that can be stored in the high-order transmission frame is determined depending on the frame configuration of the high-order transmission frame. For this reason, the received data number selection part 602 selects and outputs a fixed value based on the stuffing information detected by the stuff detector 205 in the high-order frame timing. The high-order transmission frame is configured such that the number of data pieces of the client signal to be mapped to the high-order transmission frame is Dn byte when the stuffing operation is not performed, and that the stuffing operation is performed by one byte for both the positive stuffing and the negative stuffing. In this frame configuration, the received data number selection part 602 selects and outputs Dn when the stuffing operation is not performed, Dn−1 when the positive stuffing is performed for one byte, and Dn+1 when the negative stuffing is performed for one byte, according to the output of the stuff detector 205.

The transmitted data number count part 603 includes a counter in which a high-order frame timing output from the high-order frame generator 601 is provided as a load pulse, and counts the number of transmitted data pieces of the client signal output as an optical signal in the high-order frame timing, using the output clock of the VCXO 212. The transmitted data number count part 603 is realized by the same configuration as that of the received data number count part 302 in the transmitting equipment described above. Thus it is possible to measure the number of transmitted data pieces of the client signal transmitted as the optical signal in the high-order frame timing with ease and high accuracy.

The integration counter 604 integrates the difference between the outputs of the received data number selection part 602 and of the transmitted data number count part 603 for each high-order frame timing, thereby measuring the difference in the receiving equipment between the number of data pieces of the received client signal and the number of data pieces of the client signal transmitted as an optical signal. The VCXO 212 is configured as the PLL controlled by the result of phase comparison from the integration counter 604. The VCXO 212 is controlled so that the output of the integration counter 604 is zero through the filter part 211 that determines the control characteristics of the PLL. When the output of the integration counter 604 positively increases and the number of data pieces of the client signal received in the receiving equipment is larger than the number of data pieces of the client signal transmitted as an optical signal, the filter part 211 controls the control voltage of the VCXO 212 to increase the clock frequency of the output of the VCXO 212. In this way the filter part 211 controls the PLL to increase the number of data pieces of the client signal to be transmitted as an optical signal. On the other hand, when the output of the integration counter 604 negatively increases and the number of data pieces of the client signal received in the receiving equipment is smaller than the number of data pieces of the client signal transmitted as an optical signal, the filter part 211 controls the control voltage of the VCXO 212 to reduce the clock frequency of the output of the VCXO 212. In this way the filter part 211 controls the PLL to reduce the number of data pieces of the client signal to be transmitted as an optical signal.

The demultiplexing equipment 50 can serve as the PLL to control the clock frequency of the output of the VCXO 212 by performing the de-stuffing operation so that the output of the integration counter 604 is zero on a time average basis. With this configuration, the demultiplexing equipment 50 can control so that the number of data pieces of the received client signal mapped to the high-order transmission frame is identical to the number of data pieces of the client signal transmitted as an optical signal. As a result, it is possible to transmit the received client signal mapped to the high-order transmission frame without missing data, to the next stage optical transmission system. Further the demultiplexing equipment 50 detects the number of data pieces of the received client signal mapped to the high-order transmission frame as well as the number of data pieces of the client signal transmitted as an optical signal with high accuracy, without using the address values of the read address counter and write address counter of the FIFO memory. Thus the demultiplexing equipment 50 can know the phase difference between the clock phase of the client signal provided by the stuffing information in the multiplexing equipment 40, and the clock phase of the client signal transmitted as an optical signal. In this way the demultiplexing equipment 50 can generate a reproduction clock of the client signal by controlling the PLL so that the difference between the phases is zero.

The phase comparator of the PLL includes the received data number selection part 602, the transmitted data count part 603, and the data integration counter 604. Because the received data number selection part 602, transmitted data count part 603, and data integration counter 604 all can be easily formed by a digital logic circuit, the entire phase comparator of the PLL can be digitalized, having excellent compatibility with the LSI (Large Scale Integration) manufacturing process.

Figure 14:
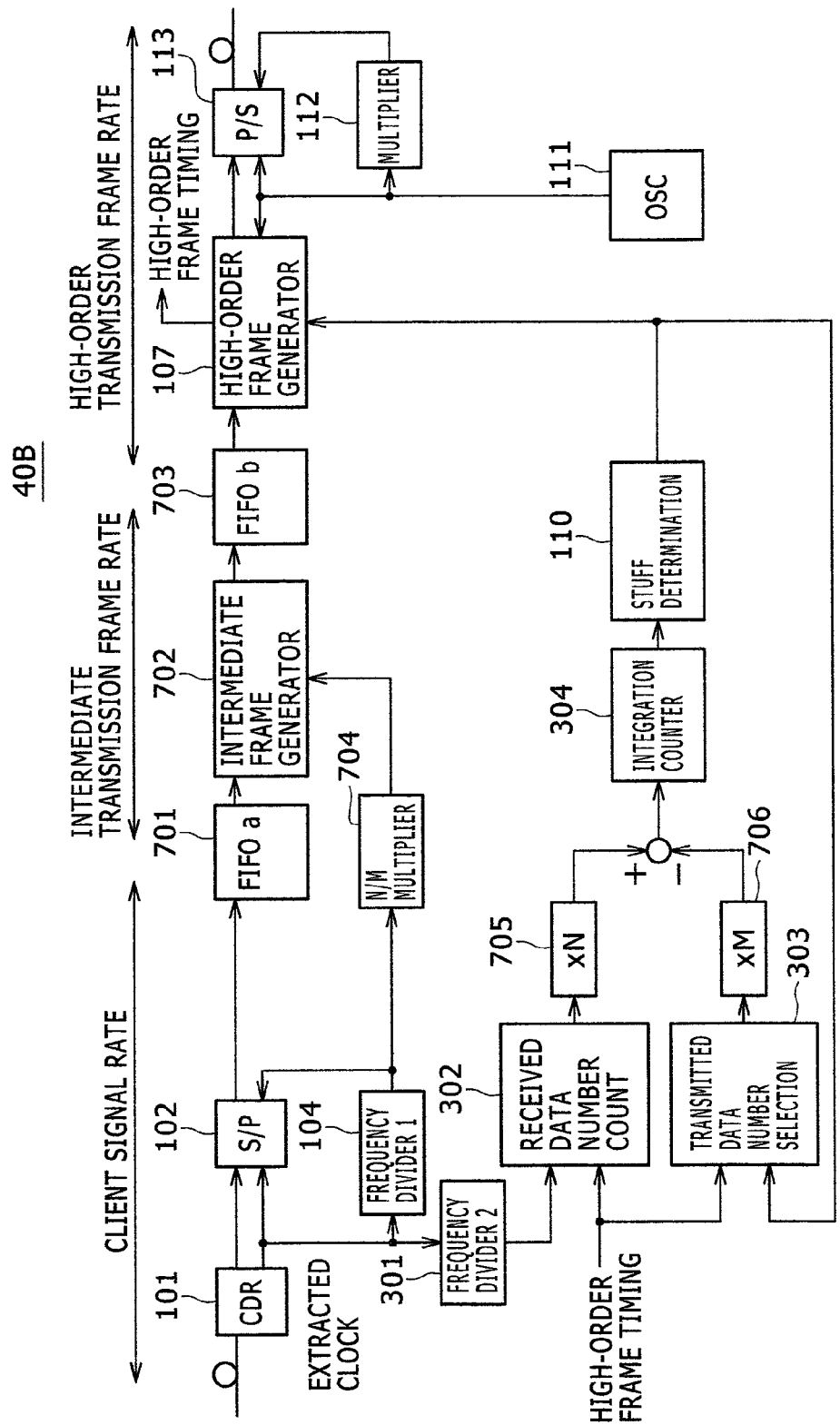
FIG. 14 is a block diagram showing another example of multiplexing equipment.

FIG. 14 is a block diagram showing another example of multiplexing equipment. In FIG. 14, multiplexing equipment 40B performs multiple mapping that once maps the received client signal synchronously to the intermediate transmission frame, and then maps the signal asynchronously to the high-order transmission frame. Incidentally, for illustrative convenience, read address counters and write address counters in FIFOa 701 and in FIFOb 703 are omitted. The FIFOa 701 is used for synchronous mapping between the client signal and the intermediate transmission frame. The FIFOb 703 is used for asynchronous mapping between the intermediate transmission frame and the high-order transmission frame. The multiplexing equipment 40B includes: the high-order frame generator 107 for generating a high-order frame timing used as a unit frame timing; the frequency divider 301 for frequency dividing an extracted clock of a client signal extracted in the CDR 101 to a range of frequency available for count operation in the received data count part 302; the received data number count part 302 for counting the number of data pieces of the client signal received in the high-order frame timing, using the output clock of the frequency divider 301; the transmitted data number selection part 303 for selecting the number of data pieces of the output client signal mapped to the high-order transmission frame in the high-order frame timing; multipliers 705 and 706 for correcting the numbers of data output from the received data number count part 302 and from the transmitted data number selection part 303, respectively, according to the ratio of the synchronous mapping between the client signal and the intermediate transmission frame; the integration counter 304 for integrating the difference between the outputs of the multipliers 705 and 706 for each high-order frame timing; and the stuff determination circuit 110 for making a stuff determination when the output of the integration counter 304 exceeds a certain threshold.

In FIG. 14, the asynchronous mapping is performed in speed conversion from the intermediate transmission frame to the high-order transmission frame. As the stuffing operation in the high-order transmission frame is performed to the data of the intermediate transmission frame, when the positive stuffing of one byte is performed in the high-order transmission frame, the FIFOb 703 stops reading the data of the intermediate transmission frame for one byte. The intermediate transmission frame is added with data such as the overhead information of the intermediate transmission frame, in addition to the data of the client signal. When the ratio of the total number of data pieces of one frame in the intermediate transmission frame and the number of client data pieces of one frame in the intermediate transmission frame is N:M, the number of data pieces of the client signal in the intermediate transmission frame for one byte is equivalent to M/N bytes. In order to correct this difference, the multiplier 705 multiplies the output of the received data number count part 302 by N. The multiplier 706 multiplies the output of the transmitted data number selection part 303 by M. Further the integration counter 304 integrates the difference between the correction results from the multipliers 705 and 706 for each high-order frame timing. In this way the multiplexing equipment 40B can measure the difference between the number of data pieces of the received client signal and the number of data pieces of the output client signal mapped to the high-order transmission frame. The stuff determination circuit 110 notifies the read address counter of the FIFOb 703 and the high-order frame generator 107 to perform the positive stuffing when the output of the integration counter 304 increases over the unit of stuffing, and to perform the negative stuffing when the output decreases below the unit of stuffing, with respect to the data of the intermediate transmission frame.

The multiplexing equipment 40B can perform the stuffing operation so that the output of the integration counter 304 is zero on a time average basis. Thus the multiplexing equipment 40B can control so that the number of data pieces of the received client signal is identical to the number of data pieces of the output client signal mapped to the high-order transmission frame. As a result the multiplexing equipment 40B can map the received client signal asynchronously to the high-order transmission frame without missing data.

Further in the embodiment, upon generation of the intermediate transmission frame, a clock signal is generated by multiplying by N/M in the multiplier 704 using the output of the frequency divider 104 in order to process the intermediate transmission frame. However, in the stuffing method according to the embodiment, the asynchronous mapping is realized by making the stuff determination without using the output clock signal of the multiplier 704 at all. In other words, it is possible to make the stuff determination with high accuracy without being influenced by the jitter of the PLL and the like used for generating the clock to form the frame signal that is located in the intermediate position for the use in the multiplexing equipment.

Figure 15:
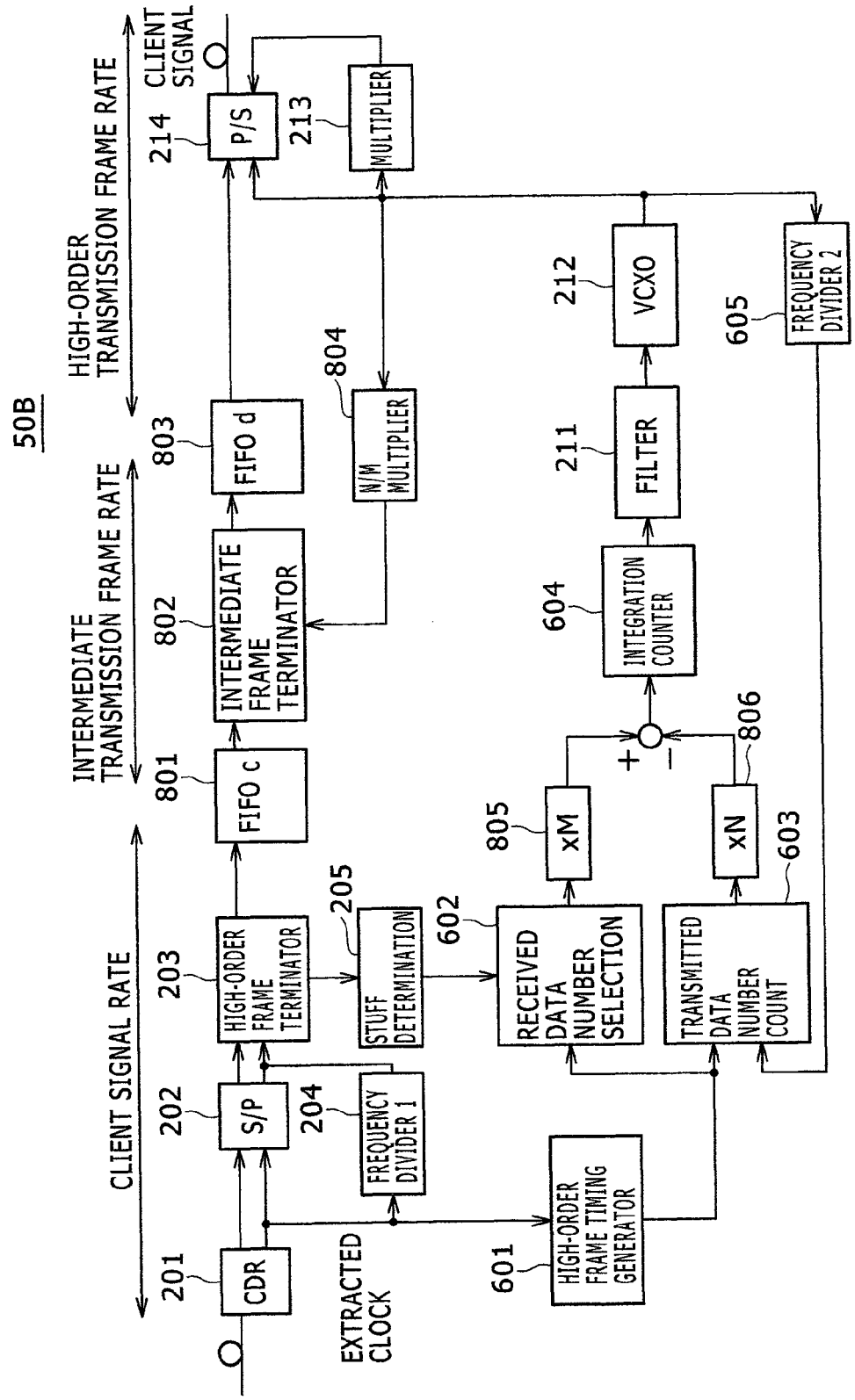
FIG. 15 is a block diagram showing another example of demultiplexing equipment.

FIG. 15 is a block diagram showing another example of demultiplexing equipment. In FIG. 15, demultiplexing equipment 50B performs multiple mapping that maps the received high-order transmission frame asynchronously to the intermediate transmission frame and then maps it synchronously to the client signal. Incidentally, for illustrative convenience, read address counters and write address counters in FIFOc 801 and in FIFOd 803 are omitted. The FIFOc 801 is used for asynchronous mapping between the high-order transmission frame and the intermediate transmission frame. The FIFOd 803 is used for synchronous mapping between the intermediate transmission frame and the client signal.

The demultiplexing equipment 50B includes: the high-order frame timing generator 601 for generating a high-order frame timing used as a unit frame timing by the extracted clock of the high-order transmission frame received from the CDR 201; the received data number selection part 602 for selecting the number of data pieces of the received client signal mapped to the high-order transmission frame in the high-order frame timing, based on the stuffing information received in the high-order frame timing; the frequency divider 605 for frequency dividing the output clock of the VCXO 212 to a range of frequency available for count operation in the transmitted data number count part 603; the transmitted data number count part 603 for counting the number of data pieces of the client signal transmitted as an optical signal in the high-order frame timing, using the output clock of the frequency divider 605; multipliers 805 and 806 for correcting data output from the received data number selection part 602 and from the transmitted data number count part 603, respectively, according to the ratio of the synchronous mapping between the client signal and the intermediate transmission frame; the integration counter 604 for integrating the difference between the outputs of the multipliers 805 and 806 for each high-order frame timing; and the filter part 211 for generating a control voltage of the VCXO 212 by calculating a filter according to the control characteristics from the output result of the integration counter 604.

In FIG. 15, the asynchronous mapping is performed in speed conversion from the high-order transmission frame to the intermediate transmission frame. Because the stuffing information notified in the high-order transmission frame is the stuffing information that was applied to the data of the intermediate transmission frame, when the positive stuffing of one byte is performed in the high-order transmission frame, the FIFOc 801 stops writing the data of the intermediate transmission frame for one byte. The intermediate transmission frame is added with data such as the overhead information of the intermediate transmission frame, in addition to the data of the client signal. When the ratio of the total number of data pieces of one frame in the intermediate transmission frame and the number of data pieces of the client signal of one frame in the intermediate transmission frame is N:M, the number of data pieces of the client signal in the intermediate transmission frame for one byte is equivalent to M/N bytes. In order to correct this difference, the multiplier 805 multiplies the output of the received data number selection part 602 by M. The multiplier 806 multiplies the output of the transmitted data number count part 603 by N. Further the integration counter 604 adds the difference between the correction results from the multipliers 805, 806 for each high-order frame timing. In this way the demultiplexing equipment 50B can measure the difference between the number of data pieces of the received client signal mapped to the high-order transmission frame and the number of data pieces of the client signal output as an optical signal.

When the output of the integration counter 604 positively increases and the number of data pieces of the client signal received in the receiving equipment is larger than the number of data pieces of the client signal transmitted as an optical signal, the filter part 211 controls the control voltage of the VCXO 212 to increase the clock frequency of the output of the VCXO 212. In this way the filter part 211 controls to increase the number of data pieces of the client signal to be transmitted as an optical signal. On the other hand, when the output of the integration counter 604 negatively increases and when the number of data pieces of the client signal received in the receiving equipment is smaller than the number of data pieces of the client signal transmitted as an optical signal, the filter part 211 controls the control voltage of the VCXO 212 to reduce the clock frequency of the output of the VCXO 212. In this way the filter part 211 controls to reduce the number of data pieces of the client signal to be transmitted as an optical signal.

The demultiplexing equipment 50B can serve as the PLL to control the clock frequency of the output of the VCXO 212 by performing the de-stuffing operation so that the output of the integration counter 604 is zero on a time average basis. Thus the demultiplexing equipment 50B can control so that the number of data pieces of the received client signal mapped to the high-order transmission frame is identical to the number of data pieces of the client signal transmitted as an optical signal. As a result, the demultiplexing equipment 50B can transmit the received client signal mapped to the high-order transmission frame without missing data, to the next stage optical transmission system. Further in the embodiment, upon generation of the intermediate transmission frame, a clock signal is generated by multiplying by N/M in a multiplier 804 using the output of the VCXO 212 in order to process the intermediate transmission frame. However, in the de-stuffing method according to the embodiment, the asynchronous mapping is realized by performing the de-stuffing operation without using the output clock signal of the multiplier 804 at all. According to the embodiment, the de-stuffing operation is performed without being influenced by the jitter of the PLL and the like used for generating the clock to form the frame signal that is located in the intermediate position for the use in the receiving equipment. In other words, it is possible to reproduce the clock of the client signal by controlling the clock frequency of the output of the VCXO 212.

Figure 16:
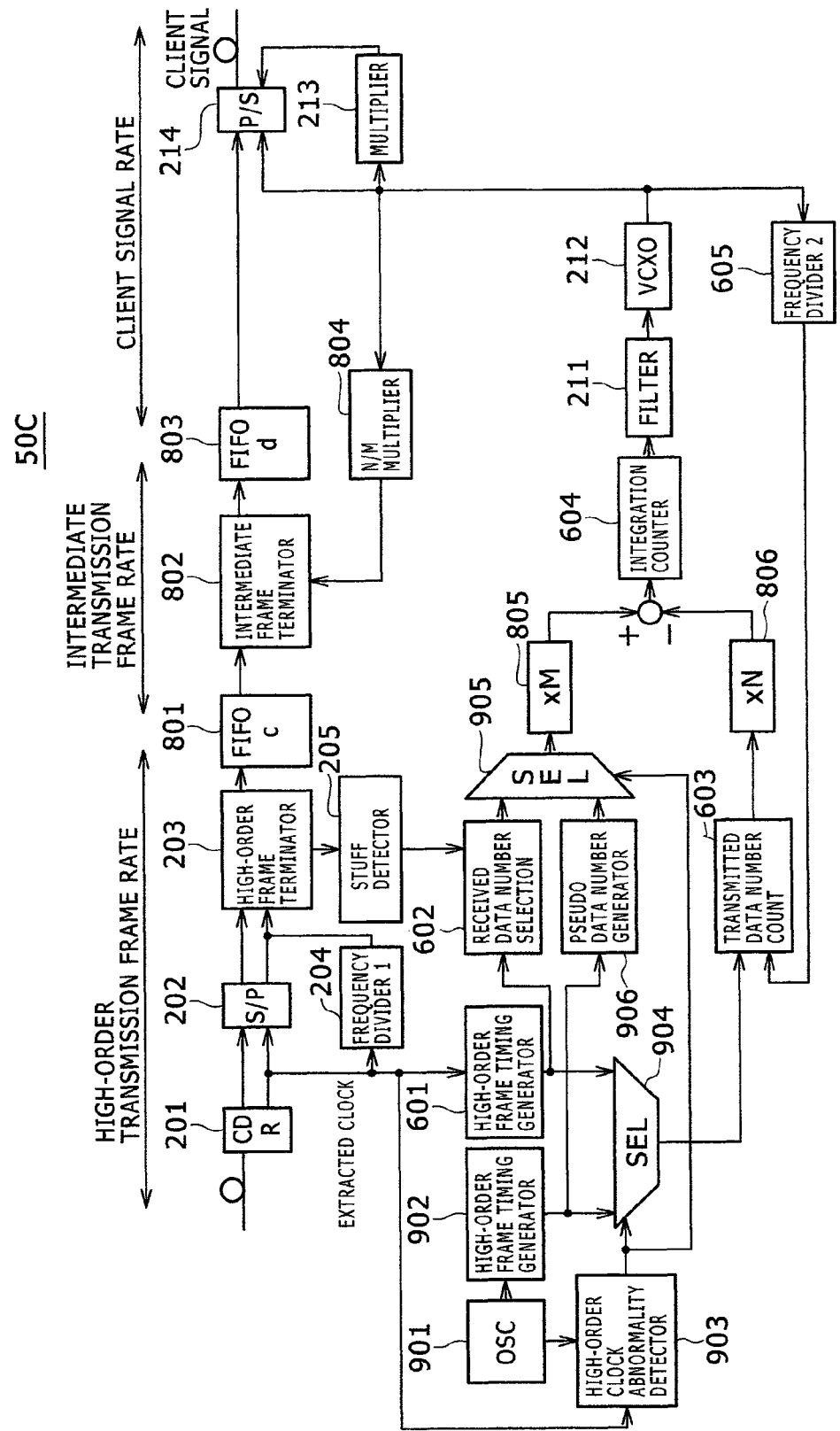
FIG. 16 is a block diagram showing still another example of demultiplexing equipment.

FIG. 16 is a block diagram showing still another example of demultiplexing equipment. In addition to the components of the demultiplexing equipment 50B in FIG. 15, demultiplexing equipment 50C in FIG. 16 includes: an independent OSC 901 within the receiving equipment; a high-order frame timing generator 902 for generating a high-order frame timing used as a unit frame timing by the output clock of the OSC 901; a high-order clock abnormality detector 903 for detecting a clock abnormality of the extracted clock of the high-order transmission frame by the output clock of the OSC 901; a pseudo data number generator 906 for generating the number of received data pieces of the client signal received in the high-order frame timing in a pseudo manner, when the clock is abnormal in the high-order transmission frame; a selector 904 for selecting between the output of the high-order frame timing generator 601 for generating using the extracted clock received from the CDR 201, and the output of the high-frame timing generator 902 for generating using the output clock of the OSC 901, according to the output result of the high-order clock abnormality detector 903; and a selector 905 for selecting between the output of the received data number selection part 602 for counting the number of data pieces of the received client signal mapped to the high-order transmission frame in the high-order frame timing, according to the detection result of the higher-order clock abnormality detector 903, and the output of the pseudo data number generator 906.

In the demultiplexing equipment 50B in. FIG. 15, the received data number selection part 602 generates the number of data pieces of the client signal received in the high-order frame timing, based on the stuffing information notified in the high-order transmission frame in the high-order frame timing. Thus when the high-order frame is in normal state, the output of the received data number selection part 602 measures the number of data pieces of the received client signal mapped to the high-order transmission frame. However, when a clock abnormality such as optical signal interruption occurs in the high-order transmission frame and when the extracted clock of the high-order transmission frame is abnormal, the received data number selection part 602 may not correctly measure the number of data pieces of the received client signal mapped to the high-order transmission frame. As a result, the clock of the client signal output to the VCXO 212 is likely to have a different clock frequency from that in normal state, sometimes disabling communication with the next stage optical transmission system.

Thus the demultiplexing equipment 50C in FIG. 16 is provided with a backup system so as not to impair communication with the next stage optical transmission system. With this configuration, even if an abnormality occurs in the clock of the high-order transmission frame, the demultiplexing equipment 50C can obtain substantially the same clock frequency as that in normal state in the output of the VCXO 212 to the extent that no problem practically arises in the communication with the next-stage optical transmission system.

In FIG. 16, as the backup system in the case where the clock abnormality occurs in the high-order transmission frame, the high-order frame timing generator 902 generates high-order frame timing by the output clock of the OSC 901. Also as the backup system in the case where the clock abnormality occurs in the high-order transmission frame, the pseudo data number generator 906 is designed to previously store the information of the number of received data pieces in the form of a data array, based on the number of times the de-stuffing is expected to be detected in the high-order frame timing when the high-order transmission frame is in normal state, and to sequentially output the number of received data pieces as the number of data pieces that is received in the high-order frame timing output by the high-order frame timing generator 902. With such a backup system, when an abnormality is detected in the extracted clock of the high-order transmission frame by the high-order clock abnormality detector 903, the output clock of the VCXO 212 can output the clock frequency of the client signal synchronized with the OSC 901 in maser-slave configuration, by switching the selector 904 to the output of the high-order frame timing generator 902 and the selector 905 to the output of the pseudo data number generator 906.

In the demultiplexing equipment 50C, even if an abnormality occurs in the clock of the high-order transmission frame, the receiving equipment can reproduce the clock frequency of the client signal synchronized with the OSC 901 in master-slave configuration, thereby enabling communication with the next-stage optical transmission system.

As described above, with the stuffing and de-stuffing methods according to the embodiment, the transmitting equipment performs the stuffing operation so that the number of data pieces of the client signal included in the unit frame timing synchronized with the high-order transmission frame is identical to the number of data pieces of the client signal transmitted to the high-order transmission frame within the unit frame timing. The receiving equipment serves as the PLL to control the clock frequency of the VCXO output by performing the de-stuffing operation so that the number of data pieces of the client signal included in the unit frame timing synchronized with the high-order transmission frame is identical to the number of data pieces of the client signal transmitted as an optical signal from the receiving equipment within the unit frame timing. In this way it is possible to perform asynchronous mapping without using the address values of the read address counter and write address counter of the FIFO memory operated by the slow clock. Further the stuffing and de-stuffing operations can be easily performed with high accuracy, making it possible to reproduce the client signal having a clock signal in which the jitter generated by the stuffing operation is suppressed.

The transmitting equipment according to the present invention can perform the stuffing operation with high accuracy. Also the receiving equipment according to the present invention can perform the de-stuffing operation with high-accuracy. As a result it is possible to suppress the jitter and wonder caused by the stuffing operation.

We claim:

1. Transmitting equipment for receiving a first client signal, speed converting the first client signal to generate a second client signal, and transmitting a high-order transmission frame including the second client signal, the transmitting equipment comprising:

a clock data recovery (CDR) part for extracting a clock signal from the first client signal;

a frequency divider for frequency dividing the extracted clock signal, wherein the frequency divider divides the extracted clock signal to a frequency within a frequency range suitable for a counting operation by a received data number count part that counts the number of data pieces of the first client signal received within a unit time;

a transmitted data number selection part for selecting and outputting a value representing the number of data pieces of the second client signal transmitted to the high-order transmission frame within the unit time;

an integration counter for integrating a difference between outputs of the received data number count part and of the transmitted data number selection part for each unit time;

a stuff determination part for making stuff determination when the output of the integration counter exceeds a threshold, wherein the stuff determination part performs stuffing insertion so that the output of the integration counter approaches zero on a time average basis;

a first multiplier for multiplying the output of the received data number count part by a first coefficient; and a second multiplier for multiplying the output of the transmitted data number selection part by a second coefficient, wherein the integration counter integrates a difference between outputs of the first multiplier and the second multiplier for each unit time.

2. Receiving equipment for receiving a high-order transmission frame, extracting a second client signal from the high-order transmission frame, speed converting the second client signal to generate a first client signal, and transmitting the first client signal, the receiving equipment comprising:

a clock data recovery (CDR) part for extracting a clock signal from the high-order transmission frame;

a frequency divider for frequency dividing the extracted clock signal, wherein the frequency divider divides the extracted clock signal to a frequency within a frequency range suitable for a counting operation by a received data number selection part that calculates the number of data pieces of the second client signal extracted based on a stuffing information received within a unit time;

a transmitted data number count part for counting the number of data pieces of the first client signal transmitted within the unit time;

an integration counter for integrating output results of the received data number selection part and of the transmitted data number count part for each unit time;

a filter part for generating a control voltage of a voltage controlled crystal oscillator from an output result of the integration counter, wherein the integration counter performs a de-stuffing operation by controlling a clock frequency of an output of the voltage controlled crystal oscillator so that an output of the integration counter approaches zero on a time average basis;

a second multiplier for multiplying the output of the received data number selection part by a second coefficient; and a first multiplier for multiplying the output of the transmitted data number count part by a first coefficient, wherein the integration counter integrates a difference between outputs of the second multiplier and the first multiplier for each unit time.

3. The receiving equipment according to claim 2, wherein the receiving equipment functions without the use of a processor that creates a gapped clock.

* * * * *

UNITED STATES PATENT AND TRADEMARK OFFICE
CERTIFICATE OF CORRECTION

| | | |
|---|---|---|
| PATENT NO. | : 7,830,924 B2 | Page 1 of 1 |
| APPLICATION NO. | : 11/754425 | |
| DATED | : November 9, 2010 | |
| INVENTOR(S) | : Kawamura et al. | |

It is certified that error appears in the above-identified patent and that said Letters Patent is hereby corrected as shown below:

Title Page, at section (73) Assignee: delete "Hitachi Communication Technologies, Ltd., Tokyo (JP)" and insert --Hitachi, Ltd., Tokyo (JP)--.

Signed and Sealed this
Twenty-sixth Day of July, 2011

David J. Kappos
*Director of the United States Patent and Trademark Office*